US012716734B2

(12) United States Patent
Kaida et al.

(10) Patent No.: US 12,716,734 B2
(45) Date of Patent: Aug. 25, 2026

(54) INFORMATION PROCESSING DEVICE

(71) Applicant: TOYOTA JIDOSHA KABUSHIKI KAISHA, Toyota (JP)

(72) Inventors: Yuto Kaida, Nagoya (JP); Hikaru Sugahara, Gifu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 19/014,654

(22) Filed: Jan. 9, 2025

(65) Prior Publication Data

US 2025/0237516 A1 Jul. 24, 2025

(30) Foreign Application Priority Data

Jan. 18, 2024 (JP) ................................ 2024-006139

(51) Int. Cl.
*G01C 21/34* (2006.01)
*B60L 58/13* (2019.01)
*G01C 21/36* (2006.01)

(52) U.S. Cl.
CPC .......... *G01C 21/3469* (2013.01); *B60L 58/13* (2019.02); *G01C 21/367* (2013.01); *G01C 21/3682* (2013.01); *B60L 2240/62* (2013.01); *B60L 2250/16* (2013.01)

(58) Field of Classification Search
CPC .............. G01C 21/3469; G01C 21/367; G01C 21/3682; B60L 58/13; B60L 2240/62; B60L 2250/16; G08G 1/0968; G08G 1/0104
USPC ................................ 701/123, 410, 428, 429
See application file for complete search history.

(56) References Cited

FOREIGN PATENT DOCUMENTS

JP 2021-063766 A 4/2021

*Primary Examiner* — Hai H Huynh
(74) *Attorney, Agent, or Firm* — SoraIP, Inc.

(57) ABSTRACT

The control unit of the information processing device detects that the vehicle enters the roadside rest facility in which the charging facility is installed. The control unit of the information processing device outputs a guidance screen, which is a screen indicating a traveling road for a vehicle in the roadside rest facility and includes a GUI component indicating a route from the present position of the vehicle to the charging facility, in response to detecting that the vehicle enters the roadside rest facility.

5 Claims, 5 Drawing Sheets

INFORMATION PROCESSING DEVICE

CROSS-REFERENCE TO RELATED APPLICATION

This application claims priority to Japanese Patent Application No. 2024-006139 filed on Jan. 18, 2024, incorporated herein by reference in its entirety.

BACKGROUND

1. Technical Field

The present disclosure relates to an information processing device.

2. Description of Related Art

In plug-in hybrid electric vehicles (PHEV) and battery electric vehicles (BEV), an automotive navigation system that recommends a charging facility in accordance with charging properties or the like of a battery is known (e.g., see Japanese Unexamined Patent Application Publication No. 2021-063766 (JP 2021-063766 A)).

SUMMARY

An object of the present disclosure is to provide technology that is capable of suitably guiding a user of a vehicle to a charging facility installed at a roadside rest facility.

One aspect of the present disclosure is an information processing device. The information processing device in that case, for example, may include a control unit that executes

- detecting entry of a vehicle into a roadside rest facility where a charging facility is installed, and
- in accordance with detecting the vehicle entering the roadside rest facility, outputting a guidance screen that is a screen indicating a traveling road for the vehicle in the roadside rest facility, and that also is a screen displaying a position of the charging facility.

Note that the present disclosure can also be understood as an information processing method in which a computer executes processing of the information processing device, as an information processing program for causing a computer to execute the information processing method, or as a non-transitory storage medium storing the information processing program.

According to the present disclosure, technology that is capable of suitably guiding a user of a vehicle to a charging facility installed at a roadside rest facility can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
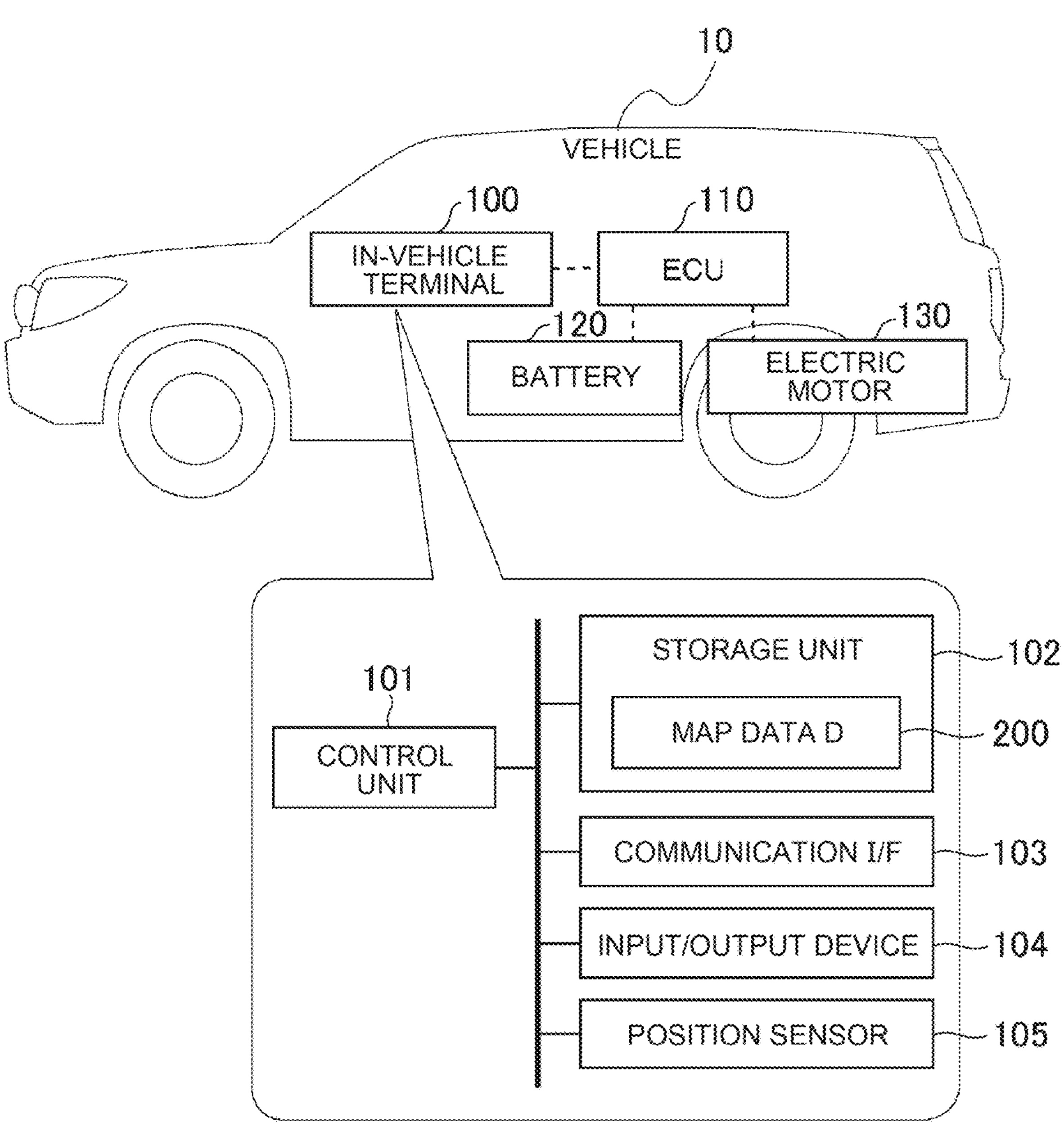
FIG. 1 is a diagram schematically illustrating an example of a configuration of a system according to an embodiment.

When a user is traveling on an automotive road such as an expressway in a vehicle equipped with a driving battery such as BEV (Battery Electric Vehicle), the user may charge the battery by leaving a roadside rest facility such as SA (Service Area) or PA (Parking Area). Incidentally, in many cases, a traveling road for a vehicle in a roadside rest facility is restricted to one-way traffic. Therefore, there is a possibility that a user who has stopped at the roadside rest facility may cause the vehicle to enter a traveling road where the user cannot reach the charging facility. In this case, the battery of the vehicle cannot be charged, which may affect the driving of the vehicle thereafter. Therefore, there is a need for a technique for guiding a user of a vehicle who has stopped at a roadside rest facility to a charging facility more reliably.

Therefore, in the information processing device according to the present disclosure, it is detected that the vehicle enters the roadside rest facility in which the charging facility is installed. In the present disclosure, "detecting that a vehicle enters a roadside rest facility" may be detecting that the vehicle has entered an approach to the roadside rest facility. Such detection may, in one example, be performed in a manner that compares the current location of the vehicle with the location of the roadway of the roadside rest facility. In another example, such detection may be performed in a manner that analyzes an image captured by a camera mounted on the vehicle.

In the information processing device according to the present disclosure, when it is detected that the vehicle enters the roadside rest facility, the control unit outputs a guidance screen in response to the detection. The guidance screen according to the present disclosure is a screen showing a traveling road for a vehicle in a roadside rest facility, and includes a GUI component showing a route from a present position of the vehicle to a charging facility.

According to the information processing device of the present disclosure, the user of the vehicle can reach the charging facility in the roadside rest facility by causing the vehicle to travel in accordance with the route displayed on the guidance screen.

The control unit of the information processing device according to the present disclosure may further enlarge the scale of the guidance screen as the distance between the vehicle and the charging facility decreases. This allows the user of the vehicle to more accurately recognize the route to the charging facility.

In addition, the control unit of the information processing device according to the present disclosure may further execute: detecting that the vehicle has entered the traveling road that is unable to reach the charging facility; and terminating the output of the guidance screen in response to detecting that the vehicle has entered the traveling road that is unable to reach the charging facility. Accordingly, it is possible to suppress the guidance screen from being displayed unnecessarily when the user does not have an intention to charge the battery of the vehicle, such as when the user stops at the roadside rest facility for the purpose of a break. When the output of the guidance screen is ended, the control unit of the information processing device according to the present disclosure may output information indicating that the battery of the vehicle cannot be charged in the charging facility of the roadside rest facility.

In addition, the guidance screen in the present disclosure may include information for identifying a traveling road that can reach the charging facility from the current position of the vehicle, and a traveling road that cannot reach the charging facility from the current position of the vehicle. Accordingly, it is possible to suppress the user who intends to charge the battery of the vehicle from entering the traveling road where the user cannot reach the charging facility.

Hereinafter, an embodiment of the present disclosure will be described with reference to the drawings. The hardware configuration, the module configuration, the functional configuration, and the like described in the following embodiments are not intended to limit the technical scope of the disclosure only thereto unless otherwise specified.

EMBODIMENT

In the present embodiment, an information processing device according to the present disclosure is applied to a device for guiding a user who drives a vehicle (BEV) to a charging facility of a roadside rest facility.

FIG. 1 is a diagram schematically illustrating an example of a configuration of a system according to the present embodiment. In the example illustrated in FIG. 1, the system in the present embodiment includes a vehicle 10 and an in-vehicle terminal 100 mounted on the vehicle 10. The vehicle 10 in the present embodiment is a BEV in which a battery 120 for driving, an electric motor 130, and an ECU (Electronic Control Unit) 110 for controlling the battery 120 and the electric motor 130 are mounted. The electric motor 130 uses the electric power of the battery 120 to drive the vehicle 10. The battery 120 is a secondary battery that can be charged by an external power source. Note that the vehicles 10 are not limited to BEV, and may be PHEV (Plug-in Hybrid Electric Vehicle).

The in-vehicle terminal 100 in the present embodiment is a computer having a car navigation function. The in-vehicle terminal 100 may be configured only by a car navigation system mounted on the vehicle. Alternatively, the in-vehicle terminal 100 may be configured by combining a plurality of in-vehicle devices such as a DCM (Data Communication Module), a head unit, and a car navigation system. Such in-vehicle terminals 100 are connected to ECU 110 through in-vehicle networking based on standards such as CAN (Controller Area Network), LIN (Local Interconnect Network), or FlexRay. Note that the in-vehicle terminal 100 may be a portable computer (for example, a smartphone, a tablet terminal, or the like) used by the user of the vehicle 10, and may be a computer in which an application program for car navigation is installed. In such cases, the in-vehicle terminal 100 may be connected to ECU 110 through radio communication according to BLE standard.

The in-vehicle terminal 100 according to the present embodiment is configured as a computer including a processor (such as a CPU or a GPU), a main storage device (such as a RAM and a ROM), and an auxiliary storage device (such as a EPROM, a hard disk drive, and a removable medium). In the present embodiment, the in-vehicle terminal 100 corresponds to an information processing device according to the present disclosure. As illustrated in FIG. 1, the in-vehicle terminal 100 according to the present embodiment includes a control unit 101, a storage unit 102, a communication I/F 103, an input/output device 104, a position sensor 105, and the like.

The control unit 101 realizes various functions as described later by executing a dedicated program stored in the storage unit 102. For example, the control unit 101 includes a hardware processor such as CPU (Central Processing Unit) or DSP (Digital Signal Processor). The control unit 101 may further include a RAM, ROM, a cache memory, and the like. Details of the functions realized by the control unit 101 will be described later.

The storage unit 102 includes an auxiliary storage device and stores various types of information. Note that the storage unit 102 may be a storage area constructed in the auxiliary storage device. In addition to OS, the information stored in the storage unit 102 includes a car navigation program, data used by the program, and the like. The data stored in the storage unit 102 in the present embodiment includes a map data D200. The map data D200 in the present embodiment includes, in addition to the road map data, map data of each of a plurality of roadside rest facilities. Further, the map data in the present embodiment also includes information for identifying whether or not a charging facility (an external power supply facility for charging the battery 120 of the vehicle 10) is installed in each of the plurality of roadside rest facilities.

The communication I/F 103 includes a communication interface for connecting the in-vehicle terminal 100 to an in-vehicle network, and a wireless communication interface for connecting the in-vehicle terminal 100 to an out-of-vehicle network (for example, a WAN (Wide Area Network) which is a global public communication network such as the Internet, a wireless communication network such as Wi-Fi (registered trademark), and the like). In one instance, the communication I/F 103 may include a communication interface for mobile communication (e.g., 3G, LTE, 5G, 6G, etc.) and a wireless communication interface for near field communication. The communication I/F 103 of the present embodiment communicates with ECU 110 of the vehicle 10 through an in-vehicle network. Further, the communication I/F 103 of the present embodiment communicates with an external device by using radio communication.

The input/output device 104 receives an input operation of the user of the vehicle and presents information to the user. The input/output device 104 includes, for example, a touch panel or a push button capable of inputting symbols such as characters, and an input device such as a microphone capable of inputting voice. Further, the input/output device 104 includes an output device such as a display or a speaker. In one example, the input/output device 104 may be configured to include a touch panel display and a speaker capable of input/output.

The position sensor 105 acquires position information (for example, latitude and longitude) indicating the current position of the vehicle. In one instance, the position sensor 105 may be configured to include a GPS (Global Positioning System) receiver. In another instance, the position sensor 105 may be configured to include radio communication circuitry that utilizes Wi-Fi location services.

Next, the control unit 101 of the in-vehicle terminal 100 will be described in detail. The control unit 101 of the in-vehicle terminal 100 has a function of performing route guidance to the destination set by the user and a function of displaying a road map screen including the current position of the vehicle 10 on the input/output device 104. In addition, it has a function of displaying a guidance screen of the roadside rest facility on the input/output device 104 in response to detecting that the vehicle 10 enters a roadside rest facility such as a SA or a PA.

Figure 2:
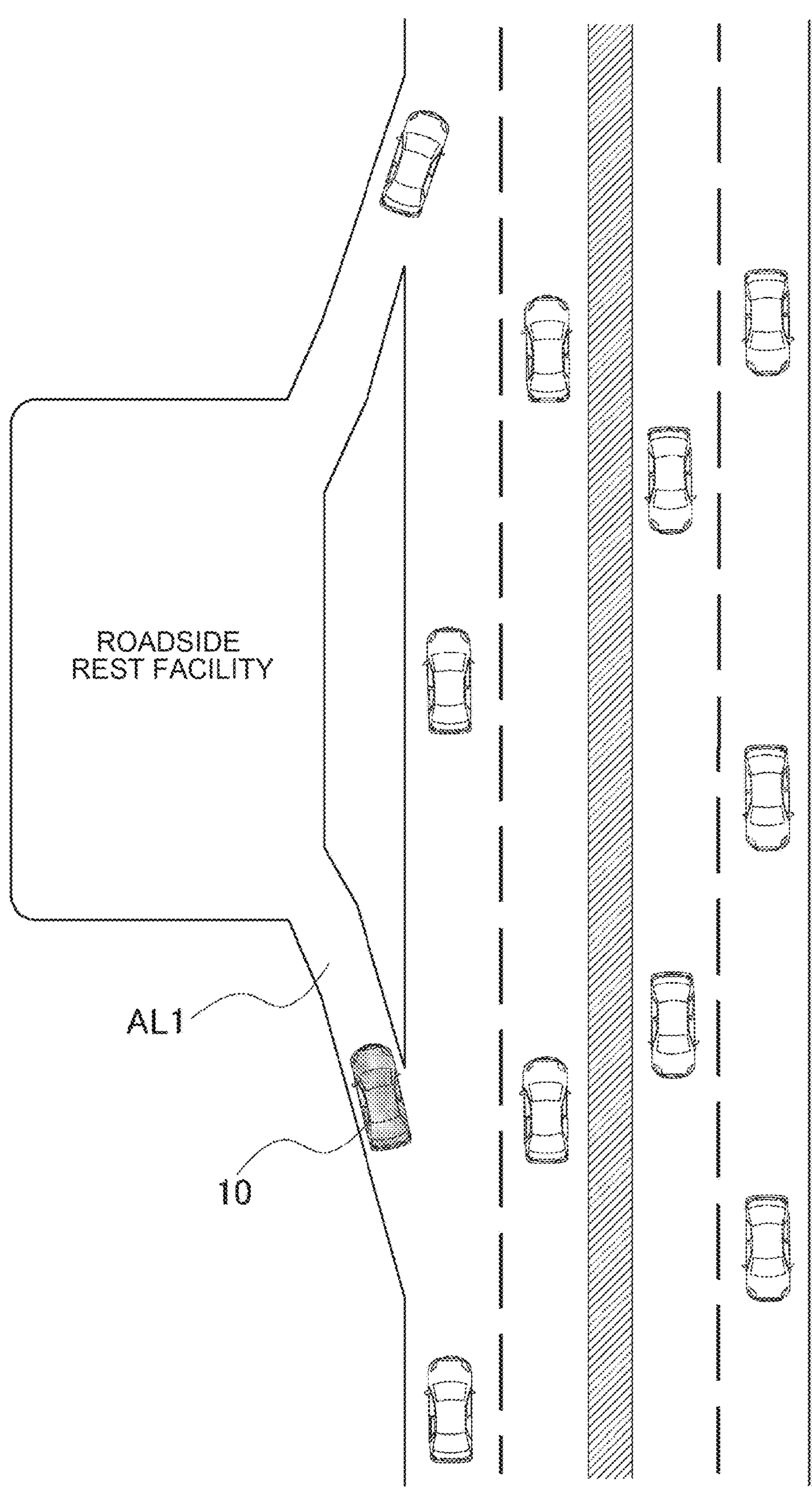
FIG. 2 is a diagram for describing an example of a method for detecting that a vehicle enters a roadside rest facility in an embodiment.

FIG. 2 is a diagram for describing an example of a method of detecting that the vehicle 10 enters a roadside rest facility. FIG. 2 illustrates a situation in which the vehicles 10 enter the approach road AL1 of the roadside rest facility from the traveling lane of the expressway. Here, as one of the functions of the car navigation system, there is a function of acquiring the current position of the vehicle 10 through the position sensor 105 at a predetermined cycle (for example, every several tens of milliseconds to several hundreds of milliseconds) and displaying the acquired current position of the vehicle 10 on a map. In the present embodiment, by using the function, the control unit 101 compares the present position of the vehicle 10 with the position of the approach road AL1 of the roadside rest facility, and determines whether the vehicle 10 has entered the approach road AL1 of the roadside rest facility. When the vehicle 10 is equipped with a camera that captures an image in front of the vehicle 10, it may be determined whether the vehicle 10 has entered the approach road AL1 of the roadside rest facility by analyzing the image captured by the camera.

In response to determining that the vehicle 10 has entered the approach road AL1 of the roadside rest facility, the control unit 101 in the present embodiment detects that the vehicle 10 has entered the roadside rest facility. When it is detected that the vehicle 10 enters the roadside rest facility, the control unit 101 of the present embodiment determines, based on the map data of the storage unit 102, whether or not a charging facility is installed in the roadside rest facility. When it is determined that a charging facility is installed in the roadside rest facility, the control unit 101 of the present embodiment accesses the map data in the storage unit 102 and extracts the map data in the roadside rest facility. Then, the control unit 101 generates a guidance screen of the roadside rest facility using the extracted map data, and outputs (displays) the generated guidance screen to the input/output device 104.

Figure 3:
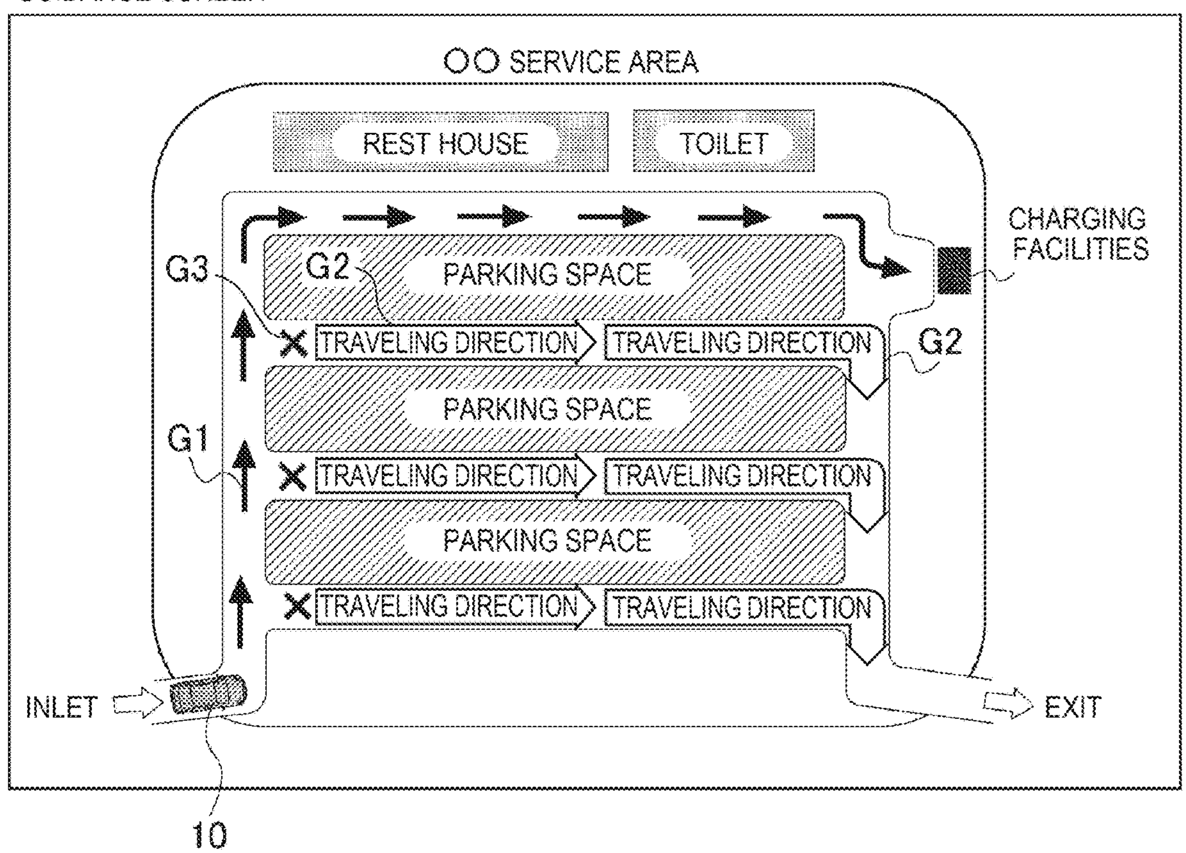
FIG. 3 is a diagram illustrating an example of a guidance screen according to the embodiment.

FIG. 3 is a diagram illustrating an example of a guidance screen in a roadside rest facility. In the example illustrated in FIG. 3, the guidance screen includes the facility name of the roadside rest facility ("○○ service area" in FIG. 3) and a map in the roadside rest facility. The map in a roadside rest facility is the position of the facility for a break (the "rest house" and the "toilet" in FIG. 3), the position of the traveling road for a plurality of vehicles installed in a roadside rest facility, the position of the parking space installed in a roadside rest facility, and the inside of a roadside rest facility It includes a position of a charging facility installed, a present position of the vehicle 10, a GUI component indicating a route from the present position of the vehicle 10 to the charging facility (an arrow G1 of a solid line in FIG. 3), a GUI component indicating a traveling direction of a plurality of vehicles (a white arrow G2 in FIG. 3), and a GUI component for identifying a traveling road that cannot reach the charging facility (an × mark G3 in FIG. 3).

When the vehicle 10 is equipped with a camera that captures an image in front of the vehicle 10, a screen in which a GUI component (for example, an arrow or the like) indicating a route to a charging facility is superimposed on an image captured by the camera may be used as a guidance screen.

Figure 4:
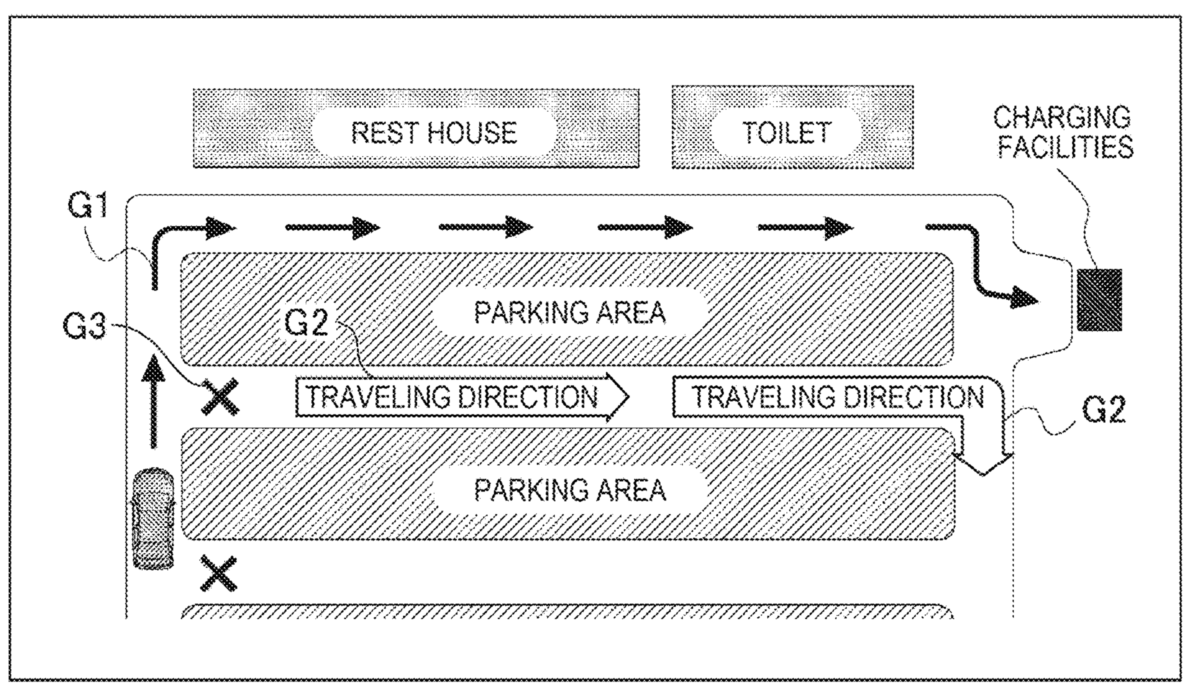
FIG. 4 is a diagram illustrating an example of a guidance screen having an enlarged scale in the embodiment.

In addition, when the vehicle 10 is traveling along the route displayed on the guidance screen described above, the control unit 101 may calculate the distance between the current position of the vehicle 10 and the position of the charging facility, and increase the scale of the guidance screen as the calculated distance decreases. Here, the distance between the current position of the vehicle 10 and the position of the charging facility is the distance between the current position of the vehicle 10 and the position of the charging facility on the route displayed on the guidance screen. FIG. 4 is a diagram illustrating an example of a guidance screen having an enlarged scale. In the example illustrated in FIG. 4, an area including only a route from the current position of the vehicle 10 to the charging facility in the map in the roadside rest facility is enlarged and displayed. When the current position of the vehicle 10 coincides with the position of the charging facility (the vehicle 10 arrives at the charging facility), the control unit 101 ends the display of the guidance screen and causes the input/output device 104 to display a normal map screen.

Further, in a condition where the guidance screen described above is displayed, when the vehicle 10 has entered the traveling road that cannot reach the charging facility (e.g., the traveling road where the × mark G3 is displayed in FIGS. 2 and 3), the control unit 101 terminates the display of the guidance screen, the normal map screen to be displayed on the input/output device 104. At this time, the control unit 101 may output information indicating that the battery 120 cannot be charged in the charging facility of the roadside rest facility to the input/output device 104.

Processing Flow

Figure 5:
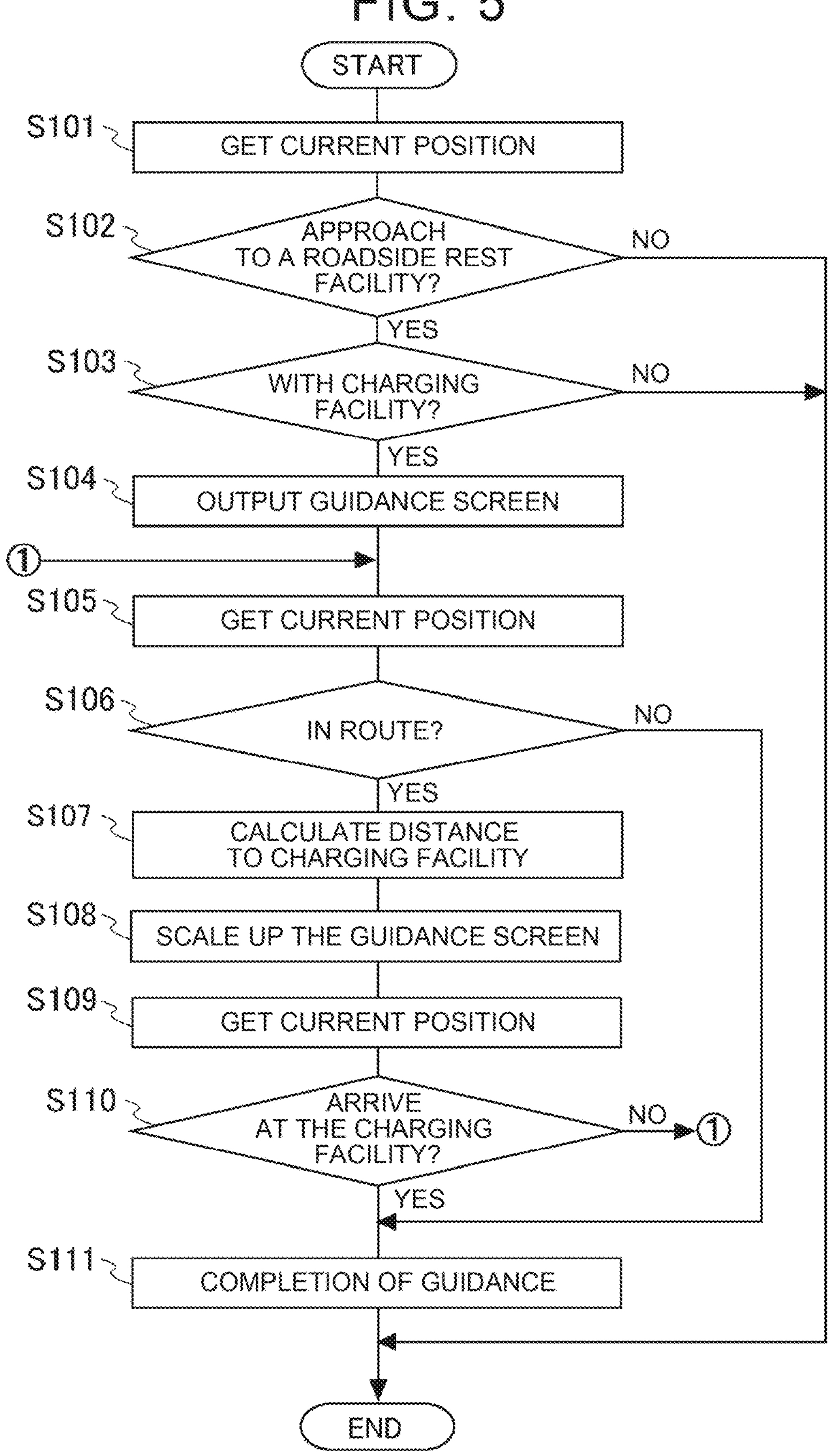
FIG. 5 is a flow chart illustrating an exemplary process routine executed by the in-vehicle terminal according to the embodiment.

Here, a flow of processing executed by the in-vehicle terminal 100 according to the present embodiment will be described with reference to FIG. 5. FIG. 5 is a flowchart illustrating an example of a processing routine executed in the in-vehicle terminal 100 at a predetermined cycle (for example, every tens of milliseconds to hundreds of milliseconds) when the vehicle 10 is traveling (for example, when the ignition switch or the power switch is in the on state).

In the process of FIG. 5, the control unit 101 of the in-vehicle terminal 100 acquires the present position of the vehicle 10 through the position sensor 105 (S101). Upon completion of S101 process, the control unit 101 executes S102 process.

In S102, the control unit 101 compares the present position of the vehicle 10 acquired by S101 with the map data of the storage unit 102 to determine whether the vehicle 10 has entered the approach road AL1 of the roadside rest facility. Specifically, the control unit 101 determines whether the present position of the vehicle 10 matches the position of the approach road AL1 of any one of the plurality of roadside rest facilities included in the map data. When the present position of the vehicle 10 does not coincide with the position of the approach road AL1 of any roadside rest facility among the plurality of roadside rest facilities included in the map data, the control unit 101 determines that the vehicle 10 has not entered the approach road AL1 of the roadside rest facility (negative determination in S102). In this case, the control unit 101 ends the execution of this processing routine. On the other hand, when the present position of the vehicle 10 matches the position of the approach road AL1 of any one of the plurality of roadside rest facilities included in the map data, the control unit 101 determines that the vehicle 10 has entered the approach road AL1 of the roadside rest facility (affirmative determination in S102). In such cases, the control unit 101 executes S103 process.

In S103, the control unit 101 determines, based on the map data of the storage unit 102, whether or not the charging facilities are installed in the roadside rest facilities corresponding to the approach road AL1 in which the vehicles 10 have entered. When the charging facility is not installed in the roadside rest facility (negative determination in S103), the control unit 101 ends the execution of this process routine. On the other hand, when a charging facility is installed in the roadside rest facility (affirmative determination is made in S103), the control unit 101 executes S104 process.

In S104, the control unit 101 displays, on the input/output device 104, a guidance screen corresponding to the roadside rest facility. Specifically, the control unit 101 first accesses the map data in the storage unit 102 and extracts the map data in the roadside rest facility. Next, the control unit 101 uses the extracted map data to generate a guidance screen as described above with reference to FIG. 3. Then, the control unit 101 displays the generated guidance screen on the input/output device 104. Upon completion of S104 process, the control unit 101 executes S105 process.

In S105, the control unit 101 acquires the present position of the vehicle 10 through the position sensor 105. Upon completion of S105 process, the control unit 101 executes S106 process.

In S106, the control unit 101 determines whether the vehicle 10 is traveling along the route displayed on the above-described guidance screen. When the vehicle 10 is traveling along the route displayed on the above-described guidance screen (affirmative determination is made on S106), the control unit 101 executes S107 process.

In S107, the control unit 101 calculates the distance from the current position of the vehicle 10 to the charging facility according to the current position of the vehicle 10 acquired by S105 and the position of the charging facility in the roadside rest facility. Upon completion of S107 process, the control unit 101 executes S108 process.

In S108, the control unit 101 enlarges the scale of the guidance screen in accordance with the distance calculated by S107. In an example, as described above with reference to FIG. 4, the control unit 101 may enlarge and display an area including only a route from the current position of the vehicle 10 to the charging facility in the map in the roadside rest facility. Upon completion of S108 process, the control unit 101 executes S109 process.

In S109, the control unit 101 acquires the present position of the vehicle 10 through the position sensor 105. Upon completion of S109 process, the control unit 101 executes S110 process.

In S110, the control unit 101 determines whether the vehicle 10 has arrived at the charging facility according to the present position of the vehicle 10 acquired by S109 and the position of the charging facility in the roadside rest facility. At this time, if the present position of the vehicle 10 acquired by S109 does not coincide with the position of the charging facility in the roadside rest facility, the control unit 101 determines that the vehicle 10 has not arrived at the charging facility (negative determination in S110). In such cases, the control unit 101 executes the processes after S105 again. On the other hand, if the present position of the vehicle 10 acquired by S109 matches the position of the charging facility in the roadside rest facility, the control unit 101 determines that the vehicle 10 has arrived at the charging facility (affirmative determination in S110). In such cases, the control unit 101 executes S111 process.

In S111, the control unit 101 ends the display of the guidance screen and causes the input/output device 104 to display a normal map screen. When S111 processing is finished, the control unit 101 ends the execution of this processing routine.

Note that, in the above-described S106, when the vehicle 10 enters a traveling road that cannot reach the charging facility (for example, a traveling road in which the × mark G3 is displayed in FIGS. 2 and 3), the control unit 101 determines that the vehicle 10 is not traveling along the route displayed on the above-described guidance screen (negative determination on S106). Then, the control unit 101 proceeds to S111, ends the display of the guidance screen, and causes the input/output device 104 to display a normal map screen. At this time, as described above, the control unit 101 may output information indicating that the battery 120 cannot be charged in the charging facility of the roadside rest facility to the input/output device 104.

Operation and Effect of Embodiments

In the above-described embodiment, the in-vehicle terminal 100 displays, in response to detecting that the vehicle enters the roadside rest facility in which the charging facility is installed, a guidance screen that is a screen indicating a traveling road in the roadside rest facility, and includes a GUI component indicating a route from the current position of the vehicle 10 to the charging facility, a GUI component identifying a traveling road that cannot reach the charging facility from the current position of the vehicle 10, and a GUI component indicating a traveling direction of the traveling road. Thus, the user of the vehicle 10 can reach the charging facility in the roadside rest facility by causing the vehicle 10 to travel in accordance with the route displayed on the guidance screen. As a result, the user who has stopped at the roadside rest facility for the purpose of charging the battery 120 of the vehicle 10 can more reliably reach the charging facility.

Further, in the present embodiment, the in-vehicle terminal 100 enlarges the scale of the guidance screen as the distance between the vehicle 10 and the charging facility becomes smaller in the roadside rest facility. This allows the user of the vehicle 10 to more accurately recognize the route to the charging facility.

Further, in the present embodiment, the in-vehicle terminal 100 terminates the output of the guidance screen when it detects that the vehicle 10 has entered the traveling road where the charging facility cannot be reached. Thus, when the user does not have the intention to charge the battery 120 of the vehicle 10, for example, when the user of the vehicle 10 stops at the roadside rest facility for the purpose of a break, it is possible to suppress the guidance screen from being displayed unnecessarily. Accordingly, it is possible to suppress the user of the vehicle 10 from remembering troublesomeness.

Therefore, according to the present embodiment, the charging facility installed in the roadside rest facility can be suitably guided to the user of the vehicle 10.

MODIFIED EXAMPLES

In the above-described embodiment, an example has been described in which the in-vehicle terminal 100 displays a guidance screen in response to the detection that the vehicle 10 enters the roadside rest facility in which the charging facility is installed. On the other hand, in the present modification, an example will be described in which the in-vehicle terminal 100 outputs a guidance screen on condition that the remaining amount (remaining battery amount) of the battery 120 of the vehicle 10 is less than the threshold value when the vehicle 10 is detected to enter the roadside rest facility in which the charging facility is installed.

Here, when the user of the vehicle 10 stops at the roadside rest facility for the purpose of rest, there is a possibility that the remaining battery capacity is relatively large (the necessity of charging the battery 120 is low). In such a case, when the in-vehicle terminal 100 displays the guidance screen, there is a possibility that the user may learn the troublesomeness. Therefore, in the present modification, when it is detected that the vehicle 10 enters the roadside rest facility in which the charging facility is installed, if the remaining battery level is equal to or greater than the threshold value, the in-vehicle terminal 100 does not display the guidance screen. The remaining battery level here may be, for example, SOC (State of Charge) of the battery 120. The threshold value may be, for example, a remaining battery amount required when the vehicle 10 travels to a destination set by the user. As another example, the threshold may be a preset fixed value (e.g., 80%).

The control unit 101 of the in-vehicle terminal 100 according to the present modification acquires the remaining battery level (SOC) by communicating with ECU 110 through the communication I/F 103 in response to the detection that the vehicle 10 enters the roadside rest facility in which the charging facility is installed. Then, the control unit 101 determines whether SOC is equal to or greater than the threshold. When SOC is less than the threshold value, the control unit 101 displays a guidance screen on the input/output device 104. On the other hand, when SOC is equal to or larger than the threshold value, the control unit 101 does not display the guidance screen on the input/output device 104.

Processing Flow

Figure 6:
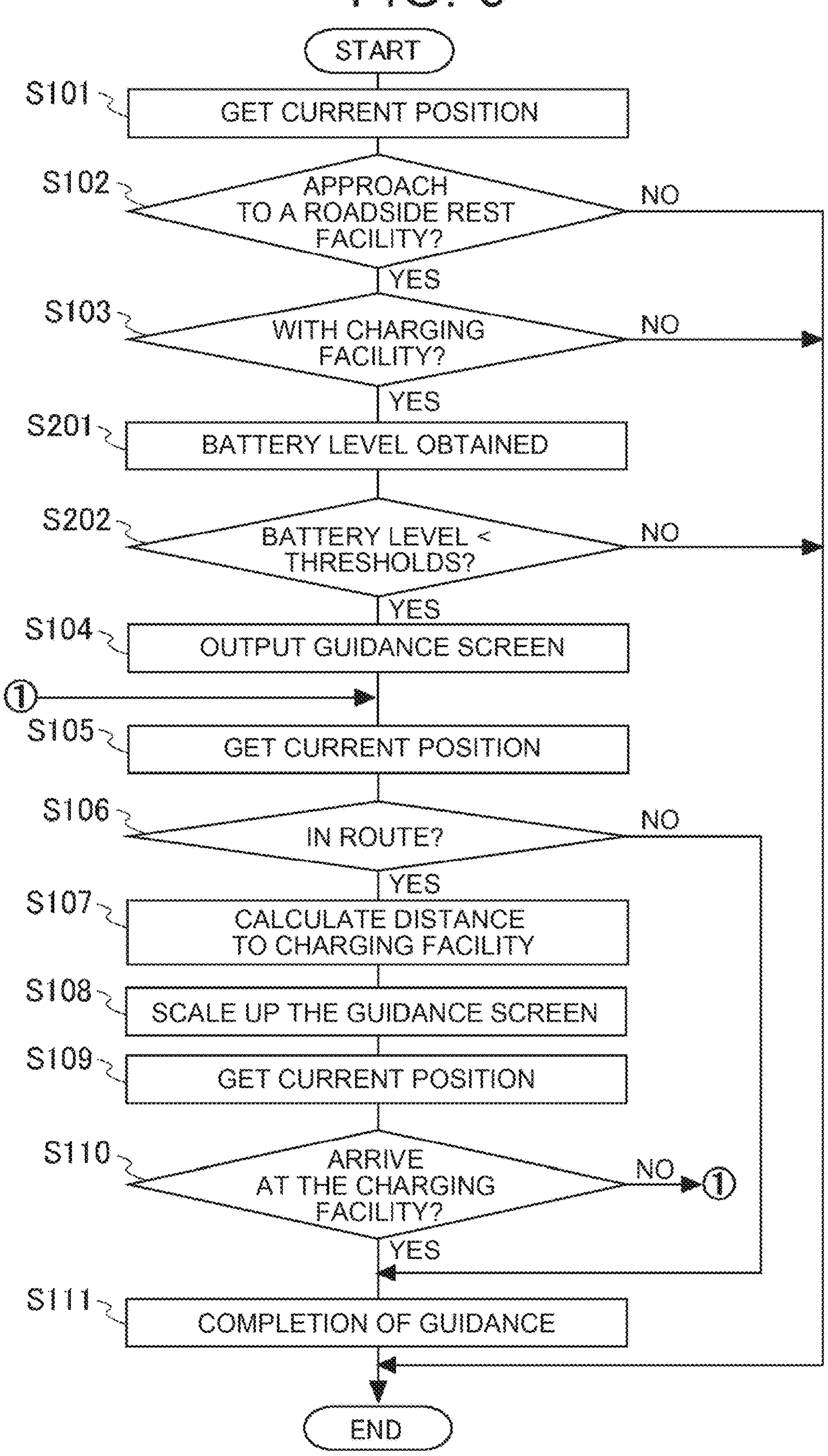
FIG. 6 is a flowchart illustrating an example of a processing routine executed by the in-vehicle terminal according to the modification.

Here, a flow of processing executed by the in-vehicle terminal 100 according to the present modification will be described with reference to FIG. 6. FIG. 6 is a flowchart illustrating an example of a processing routine executed by the in-vehicle terminal 100 at a predetermined cycle while the vehicle 10 is traveling. In FIG. 6, the same reference numerals are given to the same processes as those in FIG. 5 described above. Here, a process different from that of FIG. 5 will be described, and a process similar to that of FIG. 5 will not be described.

In the processing routine of FIG. 6, when an affirmative determination is made in S103, the control unit 101 of the in-vehicle terminal 100 executes the processing of S201. In S201, the control unit 101 acquires SOC (remaining battery capacity) of the battery 120 by communicating with ECU 110 through the communication I/F 103. When the control unit 101 finishes executing S202 process, it executes S202 process.

In S202, the control unit 101 determines whether the remaining battery level acquired by S201 is less than the threshold. As described above, the threshold value may be a battery remaining amount required when the vehicle 10 travels to a destination set by the user, or may be a fixed value (for example, 80%) set in advance. When the remaining battery level is equal to or greater than the threshold value (negative determination in S202), the control unit 101 ends the process. On the other hand, when the remaining battery level is less than the threshold value (affirmative determination is made in S202), the control unit 101 executes the processes after S104.

According to the modified example described above, the in-vehicle terminal 100 can display the guidance screen only when the remaining battery amount when the vehicle 10 enters the roadside rest facility in which the charging facility is installed is less than the threshold value. Accordingly, it is possible to suppress the user of the vehicle 10 from remembering troublesomeness.

OTHER

The above-described embodiment is merely an example, and the present disclosure can be appropriately modified and implemented without departing from the gist thereof. For example, among the functions of the in-vehicle terminal 100, the function of generating the guidance screen may be performed by an external device (for example, a server or the like) connected to the in-vehicle terminal 100 through a network.

The present disclosure can also be realized by supplying a computer program (information processing program) that implements the functions described in the above embodiments to a computer, and one or more processors included in the computer read and execute the program. Such a computer program may be provided to the computer by a non-transitory computer-readable storage medium connectable to the system bus of the computer, or may be provided to the computer via a network. The non-transitory computer readable storage medium is a recording medium which can store information, such as data and programs, by an electric, magnetic, optical, mechanical, or chemical action and which can read the information from a computer or the like. Examples of such a recording medium include any types of disks such as magnetic disks (floppy disks, HDD, or the like) and optical disks (CD-ROM, DVD disks, Blu-ray disks, or the like). The recording medium may be a medium such as a ROM, RAM, EPROM, EEPROM, a magnetic card, a flash memory, an optical card, or an SSD (Solid State Drive).

What is claimed is:

1. An information processing device comprising a control unit that executes detecting entry of a vehicle into a roadside rest facility where a charging facility is installed, and in accordance with detecting the vehicle entering the roadside rest facility, outputting a guidance screen that is a screen indicating a traveling road for the vehicle in the roadside rest facility, and that also is a screen including a graphical user interface (GUI) component indicating a route from a current position of the vehicle to the charging facility.

2. The information processing device according to claim 1, wherein the control unit further executes enlarging of a scale of the guidance screen as a distance between the vehicle and the charging facility decreases.

3. The information processing device according to claim 1, wherein the control unit further executes detecting that the vehicle entered the traveling road by which the charging facility is unreachable, and ending, in accordance with detecting that the vehicle entered the traveling road by which the charging facility is unreachable, the outputting of the guidance screen.

4. The information processing device according to claim 1, wherein the guidance screen includes information for identifying the traveling road by which the charging facility is reachable from a current position of the vehicle, and the traveling road by which the charging facility is unreachable from the current position of the vehicle.

5. The information processing device according to claim 1, wherein outputting the guidance screen includes acquiring a remaining battery charge that is a remaining charge of a battery installed the vehicle, and outputting the guidance screen in accordance with the remaining battery charge being lower than a threshold value.

* * * * *